United States Patent [19]

Edwards et al.

[11] Patent Number: 4,522,019
[45] Date of Patent: Jun. 11, 1985

[54] GRASS CATCHING RECEPTACLE

[75] Inventors: Merle L. Edwards, Port Washington; Wayne A. Meyer, Plymouth, both of Wis.; James M. Shook, San Jose, Calif.

[73] Assignee: Bolens Corporation, Port Washington, Wis.

[21] Appl. No.: 519,532

[22] Filed: Aug. 1, 1983

[51] Int. Cl.³ .................. A01D 35/22; A01D 53/06
[52] U.S. Cl. ........................................ 56/202; 56/16.6
[58] Field of Search ............. 56/202, 203, 16.6, 320.2

[56] References Cited

U.S. PATENT DOCUMENTS

| | | | |
|---|---|---|---|
| 2,955,402 | 10/1960 | Strasel | 56/16.6 |
| 3,191,370 | 6/1965 | Epstein | 56/202 |
| 3,668,846 | 6/1972 | Knight | 56/205 |
| 3,722,192 | 3/1973 | Corbett | 56/202 |
| 3,757,503 | 9/1973 | Soldavini | 56/202 |
| 3,797,214 | 3/1974 | Erdman et al. | 56/202 |
| 3,805,499 | 4/1974 | Woelffler et al. | 56/202 |
| 3,949,540 | 4/1976 | Christopherson et al. | 56/202 |
| 3,961,467 | 6/1976 | Carpenter | 56/202 |
| 3,962,852 | 6/1976 | Boyer | 56/202 |
| 3,971,198 | 7/1976 | Lane | 56/202 |
| 4,103,478 | 8/1978 | Schaefer | 56/16.6 |
| 4,126,986 | 11/1978 | Kidd | 56/202 |
| 4,152,884 | 5/1979 | Gandrud et al. | 56/202 |
| 4,158,280 | 6/1979 | Thomas et al. | 56/202 |
| 4,233,806 | 11/1980 | Richardson | 56/202 |
| 4,238,918 | 12/1980 | Saruhashi | 56/202 |
| 4,306,408 | 12/1981 | Christopherson et al. | 56/202 |

OTHER PUBLICATIONS

Murray Brochure (1979).

Primary Examiner—Paul J. Hirsch
Attorney, Agent, or Firm—Quarles & Brady

[57] ABSTRACT

A rear bagging receptacle for a power lawn mower has a lift-off collection bag and a flip-top lid. The collection bag has a frame sewn into a flexible fabric around its mouth, the frame allowing the bag to be rested on the laterally spaced, rearwardly extending legs of a handlebar frame. The flip-top lid has an integral, stiff, recessed member and yieldable, opposing fingers at a back end of the member to pivotably and detachably mount the lid to a crossbar of the handlebar frame. There, the lid pivots forwardly and downwardly to close over the mouth of the collection bag and exit of a discharge chute extending on the front edge of the collection bag. The lid also pivots upwardly and rearwardly to allow access to the collection bag and lift-off removal of the collection bag or disposable liner bag.

19 Claims, 8 Drawing Figures

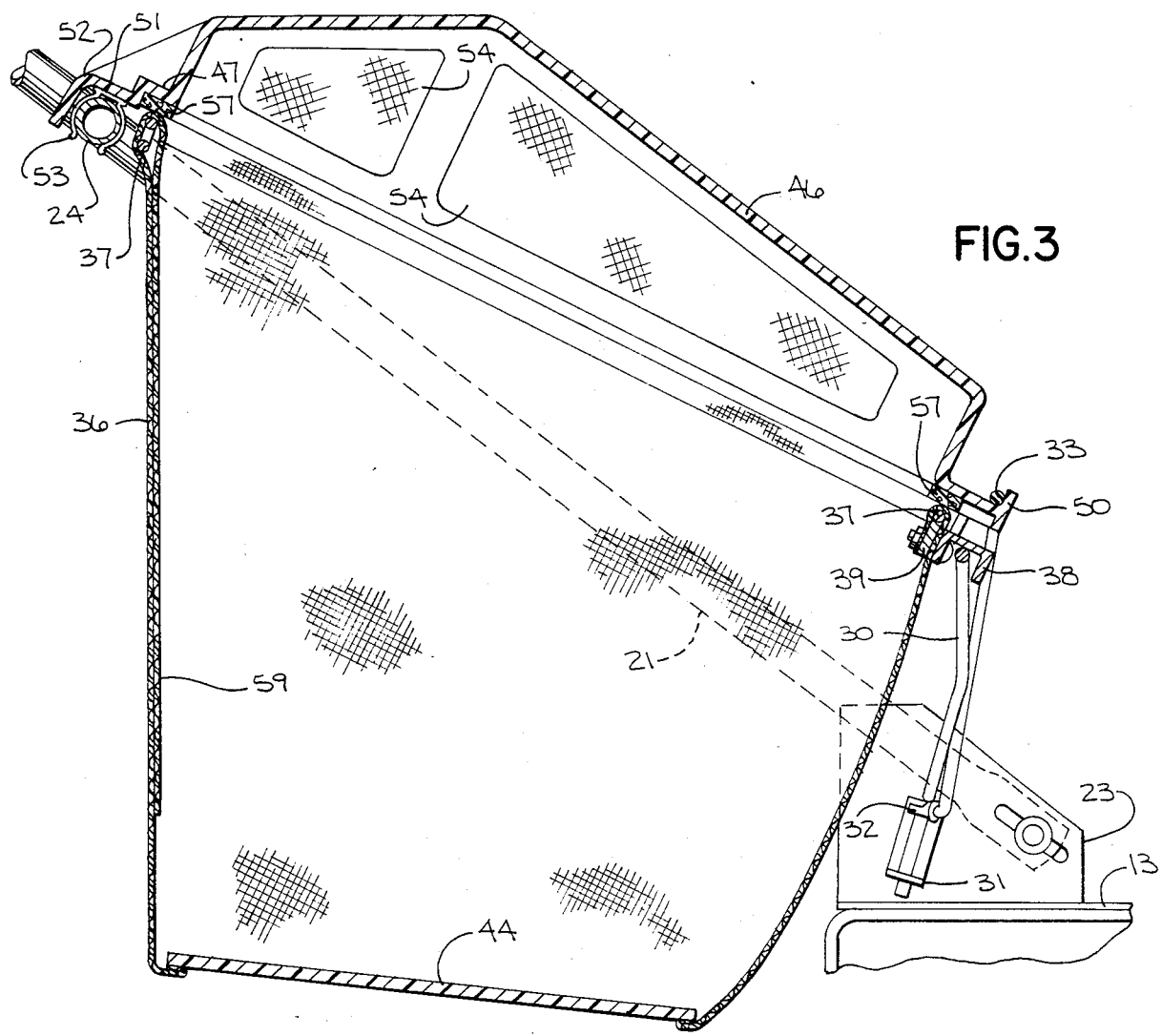
FIG.3
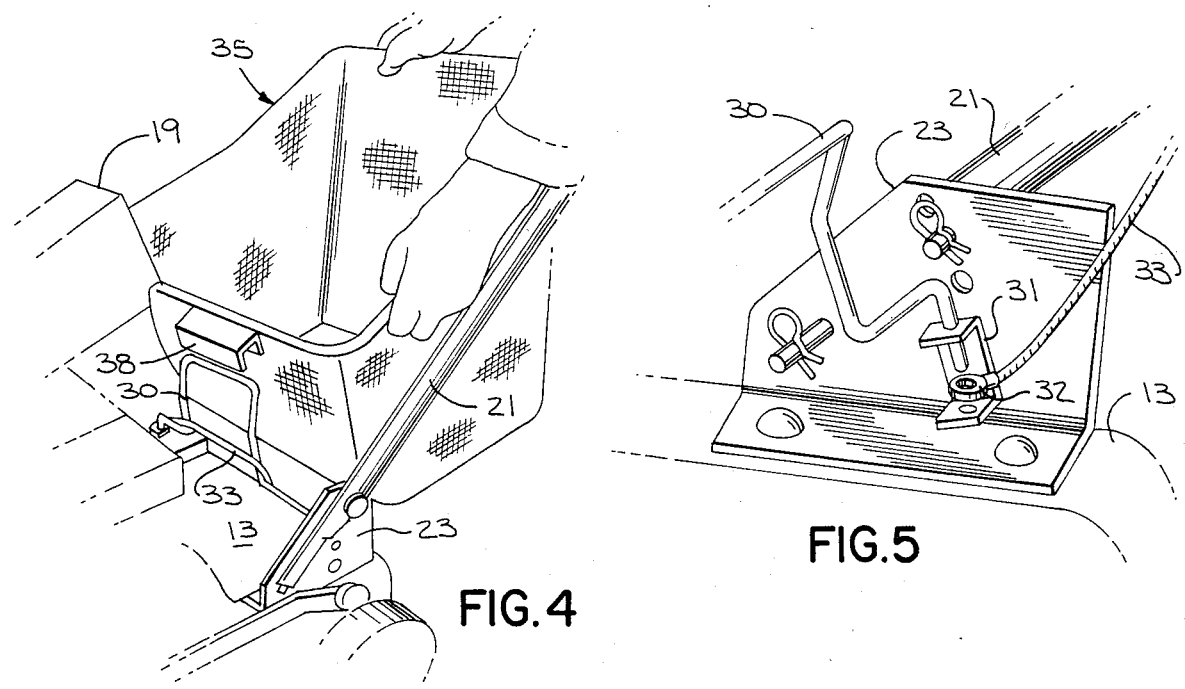
FIG.4
FIG.5

GRASS CATCHING RECEPTACLE

BACKGROUND OF THE INVENTION

I. Field of the Invention

The invention relates to grass catchers and grass bags that attach to power lawn mowers.

II. Description of the Prior Art

The lawn mower consumer looks for convenience when selecting a mower. Therefore, an important consideration in grass catching mowers is the relative ease with which a full grass bag or full grass catcher can be emptied. Another feature of grass catching mowers, which is appreciated by many, is the positioning of the grass catcher directly to the rear of the mower. Such grass catchers and their associated mowers are often referred to as "rear baggers" in contrast to "side baggers", where a bag extends to the side of the mower and requires increased space for maneuvering the mower.

The rear bagger provides advantages in mowing along fences, buildings, garden borders and the like. Unfortunately, many rear bagging grass catchers are more difficult to unload than their side bagging counterparts due to the type of hardware that must be handled to detach the rear bag. Rear-mounted bags also tend to be larger than side-mounted bags and when the rear-mounted bag is full, it can be cumbersome to handle. And, many grass bags seen today, both rear-mounted and side-mounted, have zippers or other fasteners which must be undone each time the bag is emptied. This is because the inlet into the grass catcher is generally too small to also serve as the outlet for emptying the grass bag.

A typical sequence for unloading a rear bagging mower is as follows. First, the grass bag must be detached from the mower. Second, any zippers or other fasteners or latches must be undone to open a grass dumping exit. And third, the grass bag must be lifted and aligned over some type of bag for packaging the clipped vegetation for disposal.

There has long been a need to improve the design, construction and operation of rear-mounted grass catchers. Despite the appearance of a variety of such grass catchers in recent years, these have not greatly simplified the unloading operation mentioned above.

SUMMARY OF THE INVENTION

The invention is incorporated in a grass catching receptacle with a collection bag that can be rested on the handlebar frame of a power mower and a flip-top lid that mounts and pivots on a crossbar of the handlebar frame.

The invention eliminates the need for additional hardware for mounting the grass catcher. In one prior construction of a rear-mounted grass catcher, a tubular frame separate from the handlebar frame was used to mount the grass catcher. Other prior constructions used a variety of clamps and other fasteners to attach a flexible bag portion to the handlebar frame.

The present invention provides the simplest manner of attaching and detaching a rear-mounted grass receptacle. The flip-top lid has yieldable, opposing fingers at its back end and these fingers are simply clipped onto the crossbar. The lid can be detached by pulling or lifting it with a minimum of effort to spread the yieldable fingers. The collection bag simply drops into a generally rectangular space formed by the rearwardly extending legs of the handlebar frame and the crossbar. The collection bag rests on the legs of the handlebar frame and on a bag support bracket at the back of the mower deck, and can be lifted off the mower without undoing clamps or other fasteners.

The incorporation of the pivotable lid permits a large top opening in the collection bag for removing the collected clippings. The lid and collection bag also provide an upper lip and a lower lip, respectively, which together close around an exit of a discharge chute on the power mower. The grass-receiving inlet is contiguous with the opening into the collection bag, and is a departure from prior grass catchers in which the grass-receiving inlet and grass-dumping outlet are at opposite ends.

Now, all that is required to unload a rear-mounted grass catcher is to lift up the lid and lift out the clippings, which are contained either in the collection bag or in a disposable plastic bag used as a liner in the collection bag. When a disposable bag is used as a liner, there is no need to dump clippings out of the collection bag. The grass handling operation involves the simple lifting out of the bag material in a manner resembling the emptying of a flip-top trash receptacle.

The flip-top lid of the present invention has a relatively stiff lid member which is molded to a complex, recessed shape. The lid has an intake channel with an inlet to the front and to the right side of the lid. The front end of this channel nests on the top and along the sides of the mower discharge chute to provide continuation of the discharge path from the mower into the collection bag. The lid also has a ledge extending around the portion of its perimeter and this rests on the mouth of the collection bag which is made rigid by a wire bag frame. Along the ledge of the lid is a downwardly extending skirt which holds the lid in a seated position on the rigid mouth of the collection bag.

The collection bag frame also includes abutments which fit between the spaced apart legs of the handlebar frame to prevent the collection bag from shifting sideways.

The primary object of the invention is to provide an improved rear-mounted grass catcher which makes the grass bagging operation easier and more convenient.

Another object of the invention is to provide a grass catcher that more easily and conveniently mounts on the basic elements found in power mowers, thereby making additional mounting hardware unnecessary.

Another object of the invention is to provide a compact and efficient apparatus for collecting a maximum amount of clippings in a location where the apparatus will not interfere with the maneuverability of the power mower.

Another object of the invention is to provide a rear-mounted grass receptacle which is more easily connected to the exit of a mower discharge chute.

These and other objects and advantages of the invention will be apparent from the description that follows, and from the drawings, which are a part hereof and which illustrate a preferred embodiment of the invention. This preferred form of the invention, however, is not to be understood as the only embodiment of the invention, because the scope and principle of the invention are defined by the claims, which may also encompass other embodiments.

BRIEF DESCRIPTION OF THE DRAWINGS

FIG. 3 is a sectional view of the grass catcher of the invention taken in the plane indicated by line 3—3 in FIG. 1;

FIG. 4 is a detail perspective view of the mounting of the collection bag seen in FIG. 1;

FIG. 5 is a detail inside view of the bracket seen in FIG. 4;

DESCRIPTION OF THE PREFERRED EMBODIMENT

Figure 1:
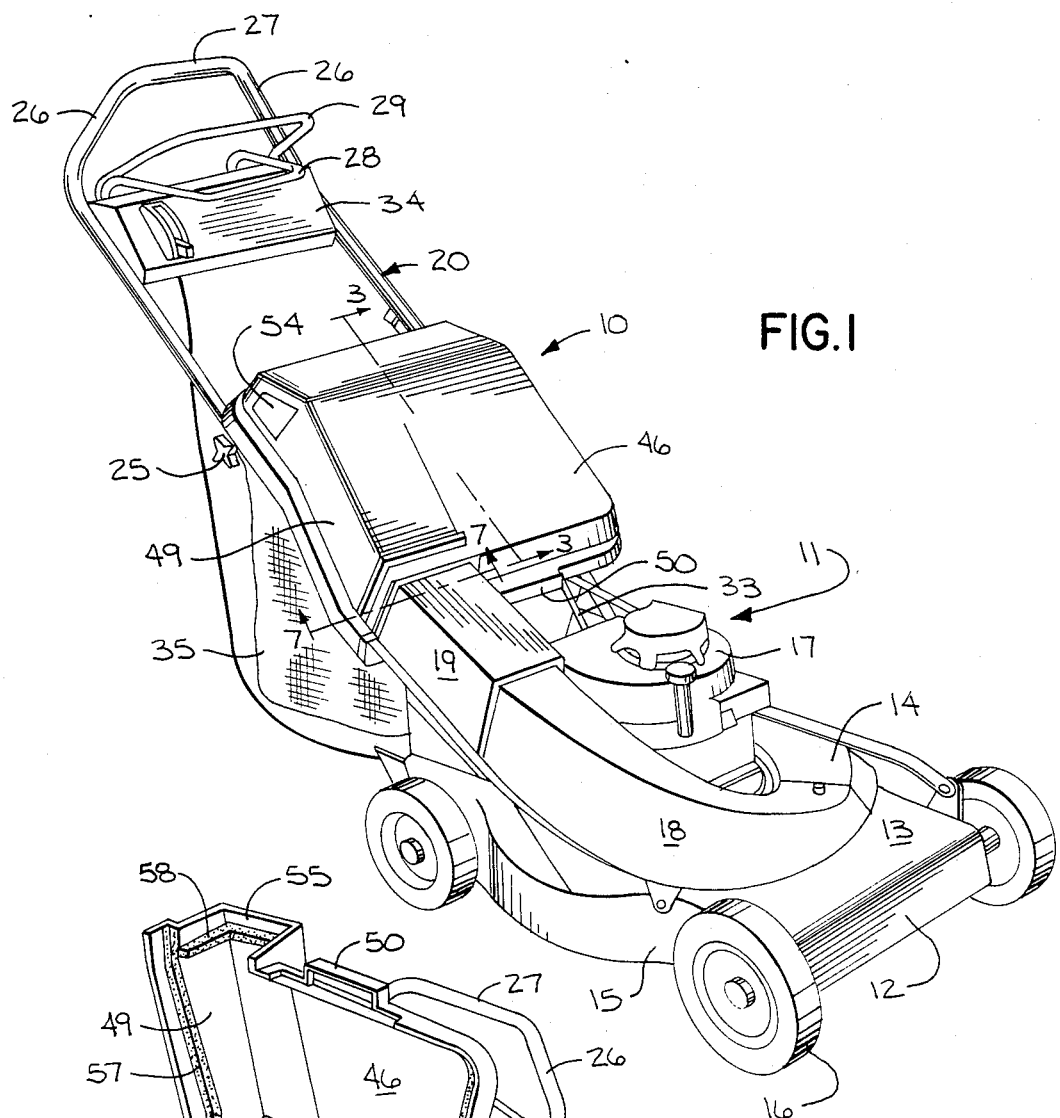
FIG. 1 is a perspective view of the grass catching receptacle of the invention installed on a power lawn mower.

The invention is exemplified by a grass catching receptacle 10 in FIG. 1, which is installed on a power lawn mower 11. A brief description of the basic elements of the mower 11 will be helpful in understanding the environment of the invention.

The parts of the mower 11 are assembled to a base 12, the top of which is referred to as a mower deck 13. The base 12 houses a rotating blade (not shown) in a cylindrical cutting chamber, as revealed by the elevation 14 in the deck 13 and the curved sidewalls 15 of the base 12. Wheels 16 are mounted as the four corners base 12 on axles located to the front and rear of the cutting chamber.

A gasoline engine 17 is mounted at the center of the mower deck 13 and is coupled through a crank shaft (not shown) to the rotating blade. As an option the engine 17 may also be coupled through a transmission beneath the mower deck 13 to drive the rear wheels 16 in a mode known as self-propulsion.

Besides these basic elements, the forward portion of the mower 11 also includes a discharge chute 18, which sweeps around the front of the engine 17 and rises upwardly along its right side (as seen from the back). The discharge chute 18 is fastened to the mower deck 13 in front of the engine where the chute 18 meets the elevation 14 in the mower deck 13. The discharge chute 18 communicates with the cutting chamber through an opening in the mower deck 13 that is covered by the chute 18 in FIG. 1. From there the chute 18 extends upwardly and rearwardly past the engine 17. A portion of the chute 18 is provided by a flip-up, transparent chute door 19 which forms the top and sides of the portion of the chute 18 leading to a discharge chute exit. The bottom of the discharge chute 18 near the exit end (seen in FIG. 7) is integrated with the main portion of the chute 18. The rotating blade creates air pressure, so that clippings can be blown through the chute 18 and out its exit end seen in FIG. 2. The forward end of the chute door 19 is pivotally connected to the main body of the chute. If clippings accumulate in the exit end of the chute 18 near the grass catching receptacle 10, the exit end of the chute door 19 is lifted to open the chute 18 for removal of such an accumulation. This completes the description of the forward portion of the mower 11.

Figure 2:
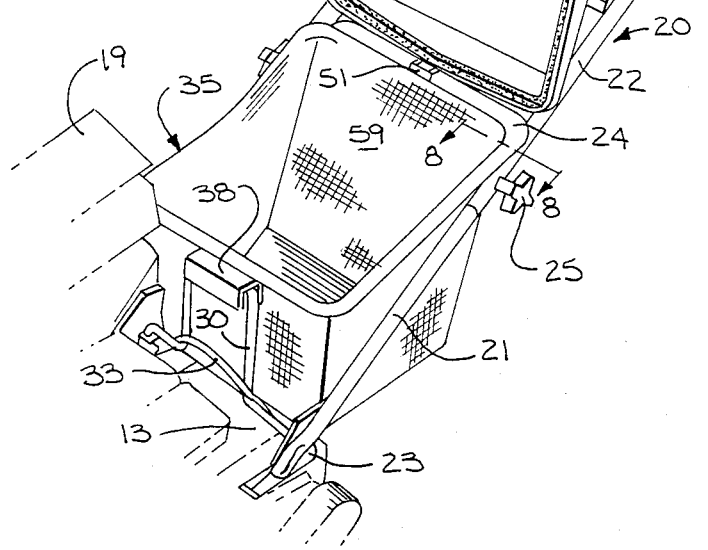
FIG. 2 is a perspective view of the grass catching receptacle of FIG. 1 with the flip-top lid pivoted to its open position.

The forward portion of the mower 11 is directed, and in some embodiments pushed, through a handlebar frame 20 that slants upwardly and rearwardly from a back end of the mower deck 13 as seen in FIGS. 1, 2, 3 and 6. Referring now to FIG. 2, the handlebar frame 20 has lower and upper tubular sections 21 and 22 which are generally U-shaped. The lower section 21 has laterally spaced legs with ends mounted to brackets 23 at the rear of the mower deck 13. These legs slant upwardly and rearwardly to a horizontally extending crossbar 24 which joins the legs and is located above, behind and generally parallel to the back end of the mower deck 13. The upper U-shaped section 22 has laterally spaced apart legs with grooved ends that fit against the tubular legs of the lower section, where they are fastened with knobbed hand screws 25. When the hand screws 25 are tightened, the upper and lower sections 21 and 22 form a rigid handlebar frame 20, and when the hand screws 25 are loosened, the upper section 22 becomes pivoting or foldable relative to the lower section 21. The legs of the upper section 22 are joined by an uppermost frame section that is bent upwardly in a plane substantially perpendicular to the plane defined by the longer part of the handlebar frame 20. This section includes two inwardly angling side grip bars 26 as well as a horizontal, centrally located handle 27 for gripping and pushing the mower.

As seen best in FIG. 1, just below the upper handle 27 and between the legs of the handlebar frame 20 is a control console 34 with looped control handles 28 and 29 for controlling engine operation and the rear-wheel-drive transmission, respectively.

Another item of mower apparatus forming the environment for the invention is a bag support 30, which is mounted at the rear of the mower deck 13. As seen in FIGS. 3 and 5 this support 30 is formed by a bent metal rod with ends received in small brackets 31 mounted on the inside of the larger brackets 23 mounting the handlebar frame 20. The ends of the bag support 30 slip through eyes 32 at the end of an elastic cord 33, the purpose of which will become apparent from the further description that follows.

The bottom portion of the grass catcher 10 in FIG. 1 is provided by a grass collection bag 35 illustrated in FIGS. 2 and 4. Referring now to FIG. 3, the body 36 of the collection bag 35 is made of an air-permeable, polyester-knit fabric. The body 36 has flaps that have been folded down around the inside and sewn around the mouth of the bag 35. The flaps fold over a bag frame 37 of metal rods and the flaps are sewn, so that the bag frame 37 is disposed in sleeves formed by the flaps. The bag frame 37 imparts shape and rigidity to the mouth of the bag 35.

Figure 7:
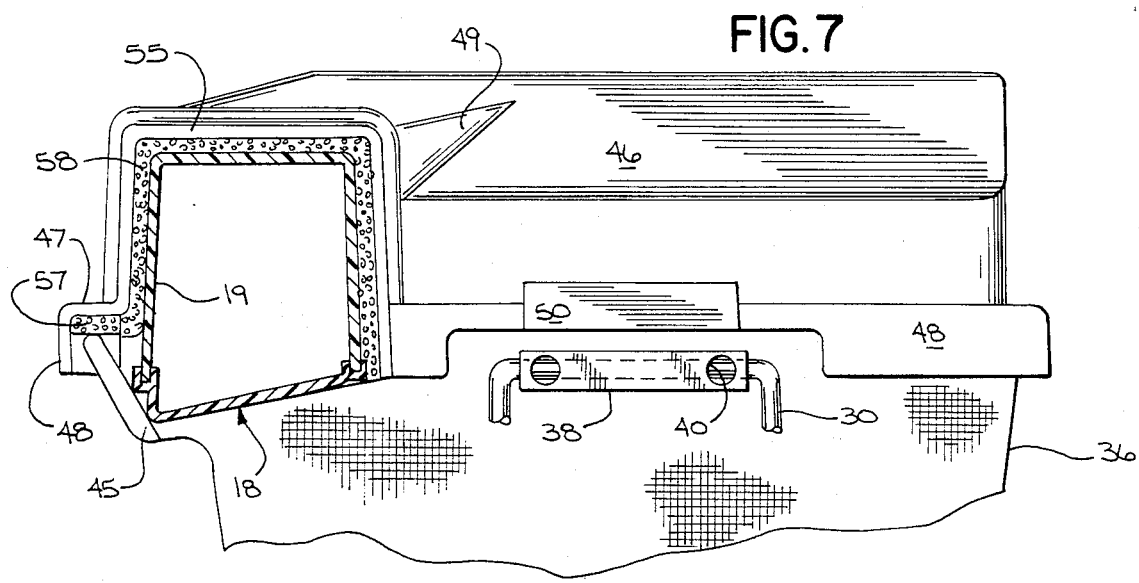
FIG. 7 is a sectional view taken in the plane indicated by line 7—7 in FIG. 1.

At the center front of the bag frame 37 as seen in FIGS. 2 and 4, a downwardly opening channel member 38 is attached. The manner of attachment is seen in FIG. 3, where the channel member 38 is bolted to a flange 39 that hangs down from the front portion of the bag frame 37. As seen in FIG. 7, the channel member 38 has apertures 40 that are provided for manufacturing purposes.

The bag 35 is mounted by resting its back corners (FIG. 6) on the legs of the lower handlebar section 21 and by supporting its front on a bag support 30 as seen best in FIG. 4. The channel member 38 rests on and over a central horizontal portion of the bag support 30 as seen best in FIGS. 6 and 7.

Figure 6:
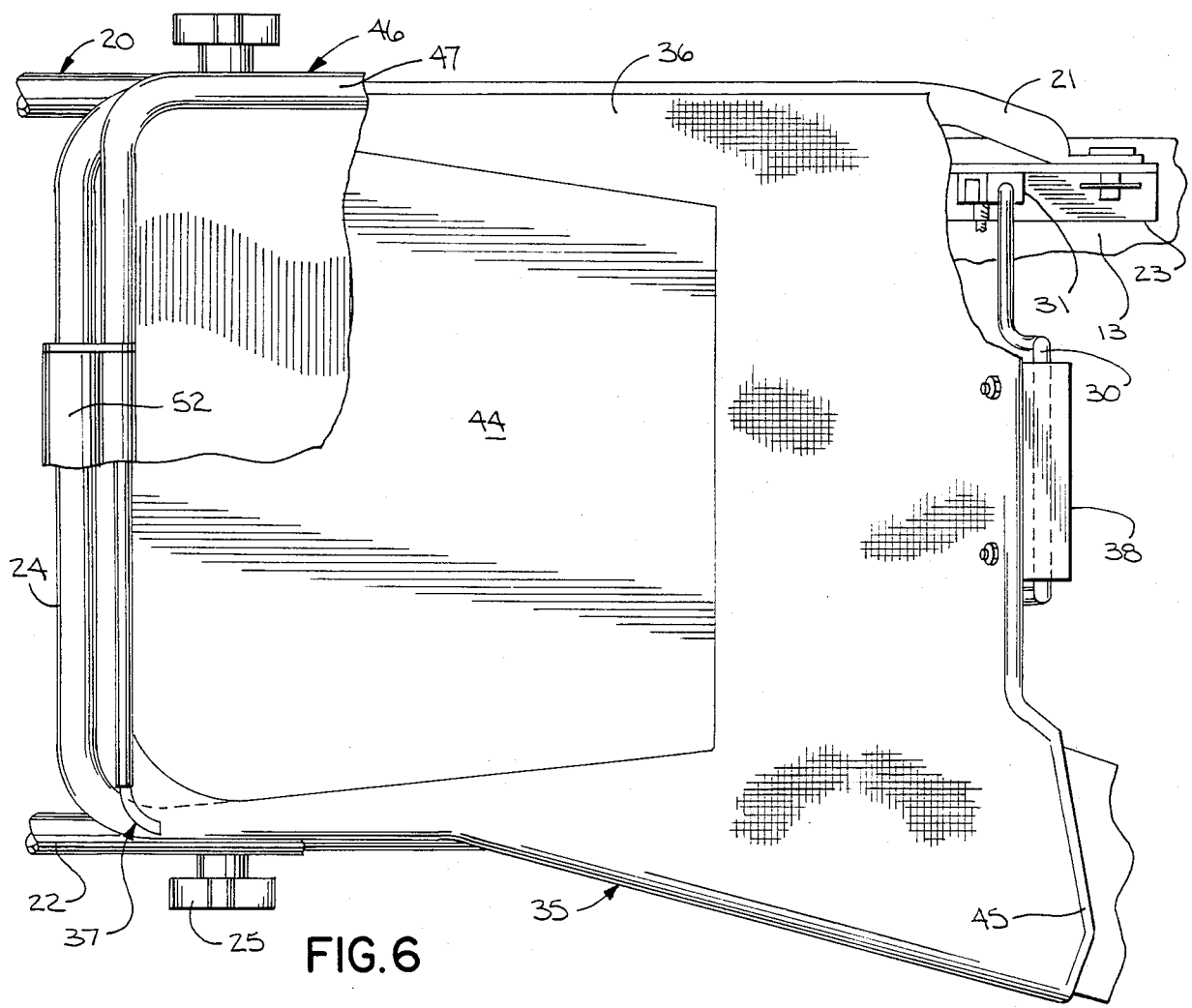
FIG. 6 is a top view of the grass catcher of FIG. 1 with parts broken away.

At the bottom of FIG. 6, the bag 35 and bag frame 37 flare outwardly along their right side to reach around one side of the discharge chute 18 as seen in FIG. 7. The bag frame 37 dips after it turns the corner from the right side to the front to form a lower lip 45 that fits underneath the discharge chute 18.

Figure 8:
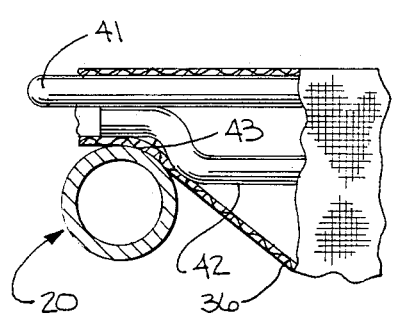
FIG. 8 is a detail view taken in the plane indicated by line 8—8 in FIG. 1.

The rear corners of the bag frame 37 seen in FIG. 6 rest on the legs of the lower handlebar section 21 just forward of the crossbar 24. As seen in more detail in FIG. 8, there is an upper rod 41 and a lower rod 42 forming the back portion of the bag frame 37, with the lower rod 42 fitting in between the legs of the handlebar frame 20 and providing abutments 43 at its ends to prevent the bag 35 from shifting sideways.

Referring to FIG. 3, it can be seen that the rear of the bag 35 is considerably deeper and is therefore mounted higher than the front of the bag 35. This results in the mouth of the bag 35 opening frontwardly as well as upwardly. Also seen in FIG. 3 is a stiff, polyethylene member 44 which is sewn into the bottom of the bag 35 to provide shape and better wear characteristics to the portion of the bag 35 which may skim the ground.

Referring back to FIG. 2, the collection bag 35 is complemented by a flip-top lid assembly, which due to the manner of mounting the collection bag 35, can be pivotably mounted on the exposed crossbar 24. The assembly is formed principally by an integral, stiff lid 46 of polypropylene material that is molded in a complex shape. The lid 46 is recessed to provide depth and height and its perimeter corresponds generally to the shape of the bag frame 37.

Along the right side of the lid 46 (as viewed from the back in FIG. 1) an intake channel 49 is formed for communication with the exit from the mower discharge chute 18. The top and sides of this intake channel form an upper lip 55 that fits down upon the top and sides of the discharge chute door 19 in a nested fashion illustrated in FIG. 7. The lid 46 has a ledge 47 seen in FIGS. 1, 3, 6 and 7 that rests on the rigid mouth of the collection bag 35. A skirt 48 depends from the ledge 47, as seen best in FIG. 7, to fit down around the perimeter of the bag frame 37, thereby seating the lid 46 on the bag frame. A handle 50 is formed by an extension of the ledge 49 from the lower front edge portion of the lid 46. When the lid 46 is resting in the position seen in FIG. 3, its handle 50 can be secured with the elastic cord 33 anchored to the small brackets 31 for mounting the bag support 30.

Referring to FIGS. 2 and 3, two side-by-side U-shaped spring members 51 are riveted to the bottom side of a rear hinge portion 52 of the lid 46. These spring members 51 provide yieldable, opposing fingers 53 that snap over and around the crossbar 24 to pivotably mount the flip-top lid. With the cord 33 removed, the lid can be lifted to the position above the crossbar 24 as seen in FIG. 2. The lid 46 can be detached from the crossbar 24 simply by pulling or lifting it with a minimum of effort to cause the yieldable, opposing fingers 53 to spread and release the crossbar 24. The lid 46 can be mounted on the crossbar 24 by pressing downwardly so as to spread the yieldable, opposing fingers 51 to receive the crossbar.

Several features are provided by the lid 46 and collection bag 35 to control air flow and dust which are blown into the grass catcher 10 from the discharge chute 18. As seen in FIGS. 1, 2 and 3, the lid 46 has screened vents 54 along its sides except for the portion forming the intake channel 49. A first strip 57 of resilient, air-impermeable material is adhesively secured to the underside of the ledge 47 to be trapped between the lid 46 and the bag frame 35 as seen at the front and back of the grass catcher 10 in FIG. 3. This strip 57 provides a seal that prevents air and debris from escaping between the lid 46 and the collection bag 35. A second strip 58 of this material is also attached inside the opening of the intake channel 49 to fit down and around the top and sides of the exit end of the discharge chute 18 as seen in FIG. 7. This completes the formation with upper lip 55 and lower lip 45 of a grass-receiving entrance into the receptacle 10. The receptacle is thus conveniently closed around the discharge chute 18, and the lid 46 is easily opened to provide a grass removal opening of larger size than the grass-receiving entrance. As a last air control feature, the collection bag 35 has an air-impermeable liner 59, illustrated in FIG. 3, which is sewn to its inside back wall to prevent dust from being blown rearwardly through the polyester-knit fabric.

This completes the details of the illustrative example of the invention. The following claims are made to define the scope of the invention.

We claim:

1. A grass catching receptacle for a power mower of the type having a mower deck, having a bag support on a rear portion of the mower deck, having a discharge chute with an exit that opens above and towards the rear of the mower deck, and having a handlebar frame with two laterally spaced legs rising upwardly and rearwardly from the rear portion of the mower deck and with a crossbar extending across the space between the two legs at a location above and behind the mower deck, the grass catching receptacle comprising:

a collection bag with an upwardly opening mouth, the collection bag having a body that is formed at least in part by a flexible fabric, and the collection bag having a rigid bag frame disposed around the mouth, wherein the bag frame is wider than the space between the legs of the handlebar frame, but shorter in length than the distance from the bag support to the crossbar, so that the bag frame is supportable on the bag support and the legs of the handlebar frame without covering the crossbar; and a rearwardly pivoting, stiff, flip-top lid for covering the mouth of the collection bag, with means at a rear end of the lid for pivotably mounting the lid to the crossbar of the handlebar frame; and wherein the collection bag and the lid have portions cooperating to form an entrance at the exit from the discharge chute, so that matter discharged therefrom will be collected and contained within the receptacle.

2. The grass catching receptacle of claim 1, wherein the means for pivotably mounting the lid includes a pair of yieldable, opposing fingers that snap over and at least partly around the crossbar of the handlebar frame for easy attachment and removal of the lid.

3. The grass catching receptacle of claim 1, wherein the lid is formed with a skirt that fits closely around the perimeter of the bag frame to seat the lid thereon.

4. The grass catching receptacle of claim 3, wherein the lid has a resilient seal disposed inside the skirt to be trapped between the lid and the bag frame.

5. The grass catching receptacle of claim 1, wherein:
the bag frame forms a lower lip that fits around the bottom of the discharge chute exit;
wherein the lid forms an upper lip that fits around the top and along the sides of the discharge chute exit; and wherein the lips formed by the bag frame and the lid cooperate to close around the exit of the discharge chute.

6. The grass catching receptacle of claim 5, wherein the lid also has a resilient seal disposed around the inside of its upper lip to be trapped between the lid and the top of the discharge chute when the lid is closed.

7. The grass catching receptacle of claim 1, wherein a laterally extending portion of the bag frame forms abutments, which fit between the spaced apart legs of the handlebar frame to prevent the collection bag from shifting sideways.

8. The grass catching receptacle of claim 1, wherein the collection bag has a rear end that is deeper than its front end so that the collection bag opens frontwardly as well as upwardly.

9. A rear bagging receptacle for a power mower of the type having a bag support on a rear portion of a mower deck, the power mower also having a discharge chute with an exit that opens above and towards the rear of the mower deck and the power mower also having a handlebar frame extending upwardly and rearwardly from the mower deck to define a generally rectangular space behind the mower deck, the receptacle comprising:
a collection bag having a rigid mouth which defines a top opening and which rests on the bag support and the handlebar frame, the collection bag having a flexible body hanging downwardly from the rigid mouth in the generally rectangular space behind the mower deck, and the rigid mouth having a portion running just underneath the discharge chute exit so that matter discharged therefrom can fall into the body of the collection bag; and
a stiff lid having an intake channel extending to its front to meet the discharge chute of the mower and means at a rear end of the lid for clip-on, pivotable attachment to the handlebar frame independent of the collection bag, so that the lid can be lifted upwardly from a position resting on the collection bag to uncover the top opening in the collection bag, and so that the lid and collection bag can be removed from the power mower independently of one another.

10. The rear bagging receptacle of claim 9, wherein the means for clip-on pivotable attachment of the lid includes a pair of yieldable, opposing fingers for snapping over and at least partly around a portion of the handlebar frame.

11. The rear bagging receptacle of claim 9, wherein:
the lid has a ledge around a portion of its perimeter that corresponds to the shape of the rigid mouth of the collection bag, so that the lid can rest on the rigid mouth of the collection bag; and
wherein the lid has a skirt depending from the ledge outside the perimeter of the mouth of the collection bag to maintain the lid in a seated position when the lid is resting on the mouth of the collection bag.

12. The rear bagging receptacle of claim 11, wherein a strip of resilient, air-impermeable material is disposed along an underside of the ledge of the lid to be trapped between the lid and the mouth of the collection bag to provide an air seal.

13. The rear bagging receptacle of claim 9, wherein a strip of resilient, air-impermeable material is disposed in an entrance of the intake chute to be trapped between the intake chute and the discharge chute.

14. A flip-top lid for covering a top opening of a collection bag that is mounted between two laterally spaced legs of a handlebar frame extending rearwardly from a power mower, wherein the power mower has an open-ended discharge chute extending at least to a front edge of the collection bag, and wherein the handlebar frame has a crossbar located behind the collection bag, and wherein the flip-top lid comprises:
a recessed, stiff member extending forwardly and laterally to cover the top opening of the collection bag and having an inlet at a front end to meet and communicate with the open end of the discharge chute; and
lid attachment means positioned at a rear end of the rigid member for clip-on pivotable mounting of the lid on the crossbar to pivot between a forward position where the lid rests on the collection bag and completes an enclosure around the open end of the discharge chute and a rearward position where the lid is disposed above the crossbar to allow access to the interior of the collection bag.

15. The flip-top lid of claim 14, wherein the lid attachment means includes a pair of yieldable, opposing fingers for snapping over and at least partly around the crossbar.

16. The flip-top lid of claim 14, wherein the inlet is defined by an intake chute with a top and sides that fit down upon the top and along the sides of the discharge chute in a nested relationship.

17. A collection bag for a power mower of the type having a handlebar frame with two laterally spaced legs extending upwardly and rearwardly from a mower deck and with a crossbar extending across the space between the two legs, and of the type having a bag support at a rear end of the mower deck, the collection bag having an upwardly opening mouth, the collection bag having a body that is formed at least in part by a flexible fabric, the collection bag having a rigid bag frame running around and defining the mouth, the bag frame being laterally wider than the space between the legs of the handlebar frame but shorter from front to back than the distance from the bag support to the crossbar, and the collection bag having means at its front that hangs on and over the bag support to prevent shifting to the front and back, so that the bag can be positioned for grass catching operation on the bag support and the two legs of the handlebar frame while leaving the crossbar free of bag-supporting apparatus.

18. The collection bag of claim 17, wherein the bag frame includes abutments which are positioned between the spaced apart legs when the collection bag is mounted on the mower to prevent the collection bag from shifting sideways.

19. The collection bag of claim 17, wherein the bag frame forms a depressed lip that fits just underneath the discharge chute.

* * * * *